United States Patent [19]
Hisada et al.

[11] Patent Number: 6,043,752
[45] Date of Patent: Mar. 28, 2000

[54] INTEGRATED REMOTE KEYLESS ENTRY AND IGNITION DISABLING SYSTEM FOR VEHICLES, USING UPDATED AND INTERDEPENDENT CRYPTOGRAPHIC CODES FOR SECURITY

[75] Inventors: Takayuki Hisada, Hyogo; Takao Miyazaki; Kazuyori Katayama, both of Tokyo, all of Japan

[73] Assignee: Mitsubishi Denki Kabushiki Kaisha, Tokyo, Japan

[21] Appl. No.: 08/885,900

[22] Filed: Jun. 30, 1997

[30] Foreign Application Priority Data

Dec. 25, 1996 [JP] Japan ................................. 8-345908

[51] Int. Cl.[7] .............................. G06F 7/04; H04L 9/00; H04K 1/00
[52] U.S. Cl. ................... 340/825.31; 380/262; 380/273; 380/274
[58] Field of Search ......................... 380/23; 340/825.31, 340/825.3, 825.34

[56] References Cited

U.S. PATENT DOCUMENTS

| | | | |
|---|---|---|---|
| 4,596,985 | 6/1986 | Bongard et al. | 340/825.69 |
| 4,792,783 | 12/1988 | Burgess et al. | 340/22 |
| 5,191,610 | 3/1993 | Hill et al. | 380/21 |
| 5,461,386 | 10/1995 | Knebelkamp | 342/44 |
| 5,477,214 | 12/1995 | Bartel . | |
| 5,724,028 | 3/1998 | Prokup | 340/825.31 |
| 5,841,363 | 11/1998 | Jakob et al. . | |

FOREIGN PATENT DOCUMENTS

| | | |
|---|---|---|
| 42 21 142 | 1/1994 | Germany . |
| 43 40 260 | 4/1995 | Germany . |
| 0 659 963 | 6/1995 | Germany . |
| 44 30 315 | 2/1996 | Germany . |
| 8-86130 | 4/1996 | Japan . |
| 8-149127 | 6/1996 | Japan . |
| 2 293 200 | 3/1996 | United Kingdom . |

*Primary Examiner*—Gail O. Hayes
*Assistant Examiner*—Anthony DiLorenzo
*Attorney, Agent, or Firm*—Sughrue, Mion, Zinn Macpeak & Seas, PLLC

[57] ABSTRACT

A remote-control unit for vehicles in which an immobilizer facility and keyless entry facility are united to enable bidirectional transmission. Further, a cost reduction is achieved by decreasing the number of parts, and labor required for maintenance is diminished. A remote-control unit for vehicles includes a circuit 16 for receiving a cryptographic code CR from a vehicle when a key 10 is fitted into a key cylinder 21, a circuit 17 for storing a cryptographic code, a control circuit for producing a first cipher system code CS1 in response to a cryptographic code, and producing a second cipher system code CS2 in response to actuation of a manual switch 12, and a transmission circuit 15 for transmitting the cipher system codes in the form of radio waves to the vehicle. The first cipher system code contains a command for permitting engine start for the vehicle, and the second cipher system code is produced on the basis of a cryptographic code in the memory circuit and contains a command for closing or opening the door lock of the vehicle.

19 Claims, 9 Drawing Sheets

INTEGRATED REMOTE KEYLESS ENTRY AND IGNITION DISABLING SYSTEM FOR VEHICLES, USING UPDATED AND INTERDEPENDENT CRYPTOGRAPHIC CODES FOR SECURITY

BACKGROUND OF THE INVENTION

1. Field of the Invention

The present invention relates to a remote-control unit for vehicles that is installed in a mechanical key (hereinafter, simply, a key) and used to transmit a dedicated cipher system code and ID code, and cooperates with a vehicle control system installed in a vehicle in controlling the door lock of a vehicle to be operated remotely and in permitting engine start, and to a vehicle security system.

2. Description of the Related Art

In recent years, a case of theft of a motorcar has tended to a marked increase, and realization of a theft prevention system capable of ensuring high security has been demanded.

Various realizations including a remote-control unit for vehicles that unfastens the door lock of a vehicle through remote control, a remote-control unit for vehicles that communicates with a vehicle using a cipher system code for the purpose of preventing theft of the vehicle, and a vehicle security system using such a remote-control unit for vehicles have been proposed in the past.

For example, a known immobilizer designed for preventing theft (illegal engine start prevention system) is such that: an engine is not started merely by fitting a key into a key cylinder for starting an engine; only when an ID code sent from a circuit in the key agrees with an ID code stored in a control unit inside a vehicle, the engine is started; and when both the ID codes disagree with each other, engine start is inhibited.

In a known keyless entry system for fastening or unfastening a door lock through a remote-control operation, unless a key having a built-in remote-control unit transmits a given cipher system code to a vehicle control unit, the door lock is, for example, not unfastened.

FIG. 12 is a block diagram schematically showing the configuration of a known vehicle security system described in, for example, Japanese Unexamined Patent Publication No. 8-86130, illustrating a vehicle security system having an immobilizer facility for judging from information to be communicated between a key and vehicle whether or not starting an engine may be permitted.

In FIG. 12, the vehicle security system functioning as an immobilizer system comprises a transponder 11A in which an ID code for use in preventing illegal engine start is written, a key 10 having the transponder 11A incorporated therein, a coil antenna 20 located in a vehicle (not shown), a key cylinder 21 having the coil antenna 20, a vehicle control unit 30A including a microcomputer mounted in the vehicle, and an engine control unit 29 to be controlled by the vehicle control unit 30A.

The vehicle control unit 30A includes a control circuit 25 formed with a CPU for responding to handling of the key 10 in the key cylinder 21, and processing transmitted data or received data, an EEPROM (electrically erasable PROM) 26 serving as a memory means for the control circuit 25, an engine communication assistance circuit 28 inserted between the control circuit 25 and engine control unit 29, and a radio-frequency transmission/reception circuit 23A inserted between the control circuit 25 and coil antenna 20.

The vehicle control unit 30A operates with power supplied from a vehicle battery 34.

Normally, when the key 10 is fitted into the key cylinder 21, a mechanical switch operates so that a key detection signal K is produced and input from the key cylinder 21 to the control circuit 25. This causes the control circuit 25 to recognize the handling for fitting the key 10 and transmit a specific ID code from the radio-frequency transmission/reception circuit 23A to the transponder 11A.

In response to the ID code, the transponder 11A transmits the specific ID code to the coil antenna 20.

The radio-frequency transmission/reception circuit 23A in the vehicle control unit 30A inputs the ID code, which has been received from the transponder 11A in the key 10 via the coil antenna 20, to the control circuit 25.

The control circuit 25 compares the received ID code with an ID code stored in advance in the EEPROM 26, and thus judges whether or not starting the engine should be permitted. Thus, it is prevented that the engine is started with another person's key, and theft can be prevented.

As shown in FIG. 12, the immobilizer system comprising the key 10 having the transponder 11A incorporated therein and the vehicle control unit 30A for communicating with the key 10 via the coil antenna 20 enjoys improved cost performance owing to the configuration thereof realized by uniting a key entry system for remotely unfastening the door lock using the transponder 11A, an immobilizer for preventing theft, and a theft-prevention alarm system.

FIG. 13 is a block diagram schematically showing the configuration of a known vehicle security system described in, for example, Japanese Unexamined Patent Publication No. 8-149127, illustrating a vehicle security system having a keyless entry facility for opening or closing a door lock or unlocking a trunk through communication.

In FIG. 13, components identical to those in FIG. 12 are assigned the same reference numerals. The description of the components will be omitted.

This vehicle security system based on a keyless entry system comprises a remote-control unit 11B for vehicles having a CPU incorporated in the key 10, a vehicle control unit 30B including a reception antenna 22, and a door lock control unit 31 to be controlled by the vehicle control unit 30B.

The remote-control unit 11B for vehicles in the key 10 consists of a manual switch 12 to be handled by a user for activating a keyless entry facility and thus opening the door lock, a compact battery 13 for supplying power to a CPU in the remote-control unit 11B for vehicles, a control circuit 14 that is the CPU to which power is supplied from the battery 13, a transmission circuit 15 for transmitting various cipher system codes CS to the antenna 22 in the form of a radio wave under the control of the control unit 14, and an EEPROM 17 serving as a memory means for the control circuit 14.

In the EEPROM 17 in the remote-control unit 11B for vehicles, different ID codes associated with individual keys 10 and different cipher system codes CS associated with respective communication operations are stored. The data of these cipher system codes CS is retrieved by the control circuit 14 for each transmission.

The vehicle control unit 30B includes a reception circuit 23 for receiving an ID code and cipher system code CS transmitted from the remote-control unit 11B for vehicles, a control circuit 25 for controlling the door lock control unit 31 in response to received data, an EEPROM 26 belonging to the control unit 25, and an input/output interface 27 inserted between the control circuit 25 and equipment mounted in a vehicle.

The input/output interface 27 is connected to a lamp 32 in a room of the vehicle and to a door 35 of the vehicle, and drives the lamp 32 according to the ON or OFF state of an open/close switch for the door 35 under the control of the control circuit 25 so that the lamp 32 lights up to indicate that the door 35 is open.

The vehicle security system shown in FIG. 13 transmits the data of a cipher system code CS in the form of a radio wave (or infrared) from the transmission circuit 15 in the remote-control unit 11B for vehicles to the reception circuit 23 in the vehicle, and communicates with the door lock control unit 31 in relation to opening or closing of the door lock or unlocking of the trunk.

In this case, the code number of a cipher system code CS is modified in order to interfere with interpretation. Thus, the theft prevention facility is further guaranteed.

However, in the aforesaid vehicle security systems, the immobilizer system (See FIG. 12) and keyless entry system (See FIG. 13) are constructed independently but do not link up mutually. For realizing both the immobilizer and keyless entry facilities, the immobilizer and keyless entry systems must be installed independently.

This requests motorcar manufacturers to preserve places in which on-vehicle equipment are mounted to materialize the immobilizer and keyless entry systems. Besides, the number of connection lines increases. Consequently, the cost required for mounting the equipment increases. As for maintenance, it is obliged to assign labor separately to the equipment.

It is conceivable to utilize unidirectional transmission of a radio wave, which is a constituent feature of the keyless entry system, in common for the immobilizer facility. For permitting engine start (lifting inhibition of engine start), keyless entry handling or handling by which the keyless entry facility is activated must be carried out by a user without fail. Moreover, unless an engine is started within a predetermined period of time, another keyless entry handling become necessary. The idea is therefore not practical.

As for unidirectional transmission achieved by the keyless entry system, a method in which transmitted data (cipher system code CS) is fixed every time cannot reliably prevent interception and interpretation.

Moreover, by merely increasing or decreasing the numerical value of transmitted data, interception and interpretation of the transmitted data or copying thereof cannot be prevented reliably. An engine may be started illegally, thus causing vehicle theft or the like.

Furthermore, even if a circuit having both the capabilities of a simple transmitter receiver (transponder 11A) included in the immobilizer system described in the Japanese Unexamined Patent Publication No. 8-86130 (See FIG. 12) and of the transmission circuit 15 in the keyless entry system (See FIG. 13) is incorporated in a key 10, cost equivalent to the cost required for simply combining the keys 10 shown in FIGS. 12 and 13 is needed. Any merit is therefore not expected cost-wise.

In the known remote-control units for vehicles and vehicle security systems, as described previously, the immobilizer and keyless entry facilities are materialized as independent units but do not link up with each other. Assuming that the facilities are simply combined, if an engine is, for example, started, keyless entry handling must be carried out without fail. This poses a problem that security, handling efficiency, and cost-performance cannot be improved fully.

SUMMARY OF THE INVENTION

The present invention attempts to solve the foregoing problems. An object of the present invention is to provide a remote-control unit for vehicles in which reductions in material cost, mounting cost, and maintenance labor have been realized by integrating the immobilizer and keyless entry facilities into a key.

Another object of the present invention is to provide a vehicle security system in which reductions in material cost, mounting cost, and maintenance labor have been realized by utilizing a vehicle control system, into which the immobilizer and keyless entry facilities are integrated, in combination with the remote-control unit for vehicles.

Yet another object of the present invention is to provide a remote-control unit for vehicles and a vehicle security system in which since the remote-control unit for vehicles is provided with a reception circuit in order to realize a bidirectional transmission facility for an immobilizer system, and a cryptographic code and cipher system code which are different every time and can hardly be interpreted by another key are transmitted or received, illegal engine start, vehicle theft, or the like caused by interception, interpretation, and copying of transmitted data has been reliably prevented, and security has been improved further.

Still another object of the present invention is to provide a remote-control unit for vehicles and a vehicle security system in which since a keyless entry system and transmission circuit are used in common in order to reduce the number of parts, sufficiently low cost has been realized, and improved security in utilization of a cipher system code has been attained.

A remote-control unit for vehicles in accordance with the present invention is a remote-control unit for vehicles that is incorporated in a key to be fitted into a key cylinder for starting an engine of a vehicle and communicates with the vehicle. The remote-control unit for vehicles comprises a reception circuit for receiving a cryptographic code sent from the vehicle when the key is fitted into the key cylinder, a memory circuit for storing the cryptographic code, a manual switch to be handled by a user, a control circuit for producing a first cipher system code responsively to reception of the cryptographic code, and also producing a second cipher system code responsively to handling of the manual switch; and a transmission circuit for transmitting the first and second cipher system codes in the form of radio waves to the vehicle. The first cipher system code contains a command for permitting start of the engine of the vehicle, and the second cipher system code is produced on the basis of a cryptographic code stored in the memory circuit and contains a command for closing or opening the door lock of the vehicle.

In the remote-control unit for vehicles according to the present invention, the cryptographic code contains a triggering signal set for specifying a vehicle. The control circuit judges from the triggering signal whether or not a cryptographic code is correct, and produces the first cipher system code in response to the triggering signal. The memory circuit stores only a cryptographic code that is judged to be correct.

In the remote-control unit for vehicles according to the present invention, the control circuit produces the second cipher system code, which is different for each communication, on the basis of a cryptographic code stored in the memory circuit.

In the remote-control unit for vehicles according to the present invention, the first and second cipher system codes are mutually different.

In the remote-control unit for vehicles according to the present invention, a radio-wave output of the first cipher system code is set to be smaller than a radio-wave output of the second cipher system code.

In the remote-control unit for vehicles according to the present invention, a cryptographic code is represented by a radio wave, and the reception circuit includes a resonant circuit composed of a coil having inductance and a capacitor having capacitance, and receives the cryptographic code through electromagnetic coupling with the resonant circuit.

In the remote-control unit for vehicles according to the present invention, a cryptographic code is represented by a magnetic wave, and the reception circuit includes a magneto-resistive device and receives the cryptographic code via the magneto-resistive device.

In the remote-control unit for vehicles according to the present invention, a cryptographic code is represented by a magnetic wave, and the reception circuit includes a Hall sensor and receives the cryptographic code via the Hall sensor.

In the remote-control unit for vehicles according to the present invention, a cryptographic code is represented by light, and the reception circuit includes a light-receiving device and receives the cryptographic code via the light-receiving device.

In the remote-control unit for vehicles according to the present invention, a cryptographic code is represented by a radio wave, and the reception circuit is formed with a radio-frequency reception circuit.

A vehicle security system employing a remote-control unit for vehicles in accordance with the present invention comprises a key in which the remote-control unit for vehicles is installed; a key cylinder, located in a vehicle, for producing a key detection signal when the key is fitted thereinto; and a vehicle control unit, mounted in the vehicle, for communicating with the remote-control unit for vehicles. The vehicle control unit includes a receiving means for receiving first and second cipher system codes sent from the remote-control unit for vehicles; a control means for producing a cryptographic code in response to a key detection signal and controlling the engine and door of the vehicle responsive to reception of the first and second cipher system codes; and a transmitting means for transmitting a cryptographic code to the remote-control unit for vehicles. The control means permits start of the engine of the vehicle in response to the first cipher system code, and controls the door lock of the vehicle in response to the second cipher system code.

In the vehicle security system according to the present invention, the control means produces a different cryptographic code for each communication.

In the vehicle security system according to the present invention, the control means produces a cryptographic code using a random count value for each communication.

In the vehicle security system according to the present invention, a cryptographic code contains a triggering signal for commanding the remote-control unit for vehicles to issue a transmission request for the first cipher system code.

In the vehicle security system according to the present invention, a triggering signal is a combination of a plurality of data items set to specify a vehicle.

In the vehicle security system according to the present invention, the control means in the vehicle control unit controls the door lock of the vehicle in response to the second cipher system code and permits start of the engine of the vehicle.

In the vehicle security system according to the present invention, the control circuit in the remote-control unit for vehicles modifies the second cipher system code for each transmission, the control means in the vehicle control unit modifies the second cipher system code for each reception, and the vehicle control unit includes the memory means for storing the second cipher system code that is modified for each reception. When a difference between a received second cipher system code and a second cipher system code stored in the memory means falls within a certain range, the control means judges that the received second cipher system code is correct, and controls the door lock of the vehicle in response to only the second cipher system code judged to be correct.

The vehicle security system according to the present invention further comprises an annular coil antenna located in the key cylinder so that the antenna can cooperate with the transmitting means in the vehicle control unit. The reception circuit in the remote-control unit for vehicles includes a resonant circuit composed of a coil having inductance and a capacitor having capacitance. A cryptographic code is represented by a radio wave and transmitted to the reception circuit via the coil antenna owing to electromagnetic coupling with the resonant circuit.

The vehicle security system according to the present invention further comprises a magnet means located in the key cylinder so that the magnet means can cooperate with the transmitting means in the vehicle control unit. A cryptographic code is represented by a magnetic wave, and transmitted to the reception circuit in the remote-control unit for vehicles via the magnet means owing to a magnetic response effect.

The vehicle security system according to the present invention further comprises a light-emitting device located in the key cylinder so that the light-emitting device can cooperate with the transmitting means in the vehicle control unit. The reception circuit in the remote-control unit for vehicles includes a light-receiving device. A cryptographic code is represented by light and transmitted to the reception circuit via the light-receiving device.

DESCRIPTION OF THE PREFERRED EMBODIMENTS

First Embodiment

The first embodiment of the present invention will be described in conjunction with the drawings.

Figure 1:
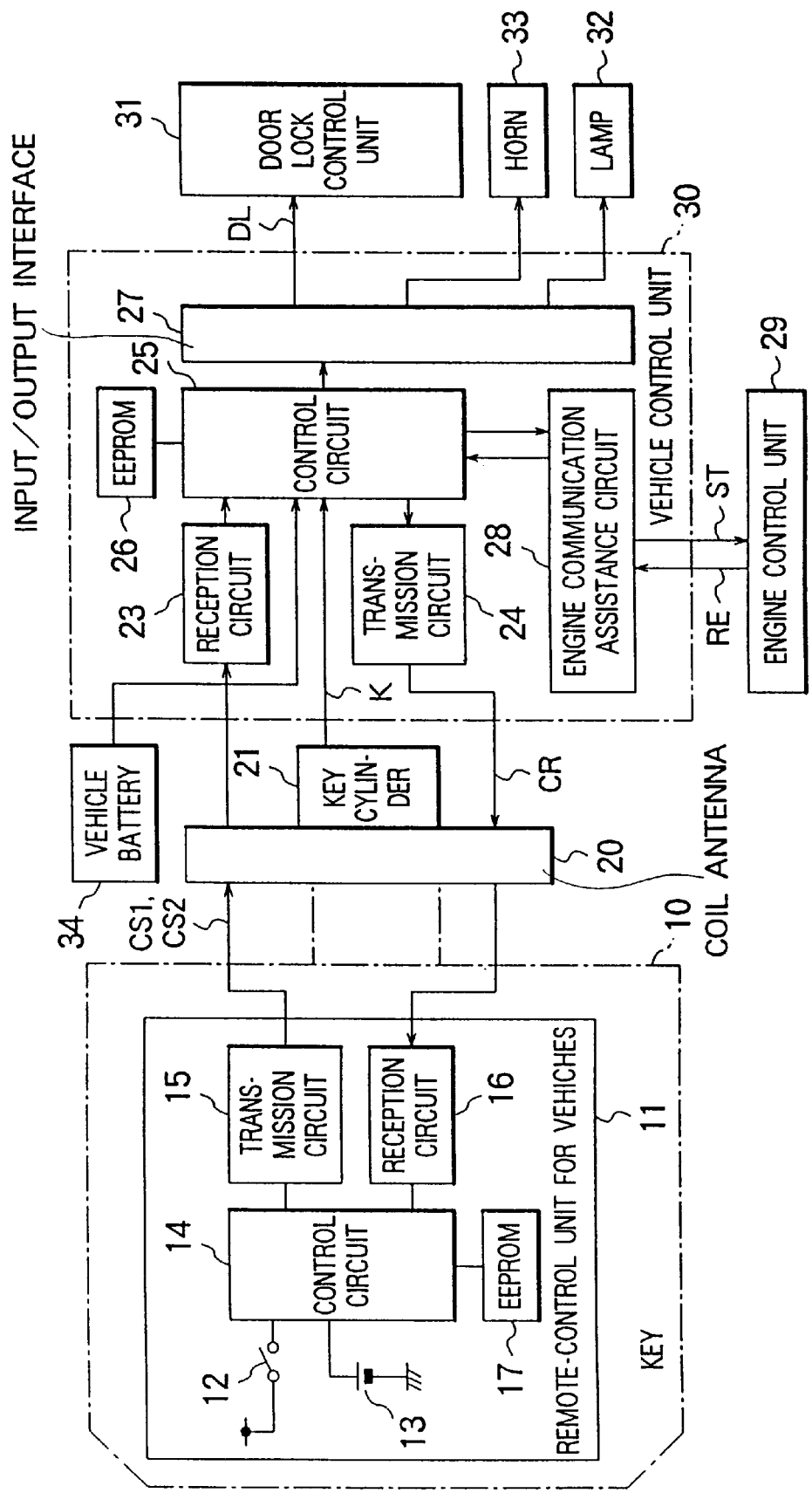
FIG. 1 is a block diagram showing the configuration of a vehicle security system in accordance with the first embodiment of the present invention.

FIG. 1 is a block diagram showing the configuration of a vehicle security system in accordance with the first embodiment of the present invention, schematically illustrating a remote-control unit for vehicles and a vehicle control unit that is a mate of the remote-control unit.

Figure 12:
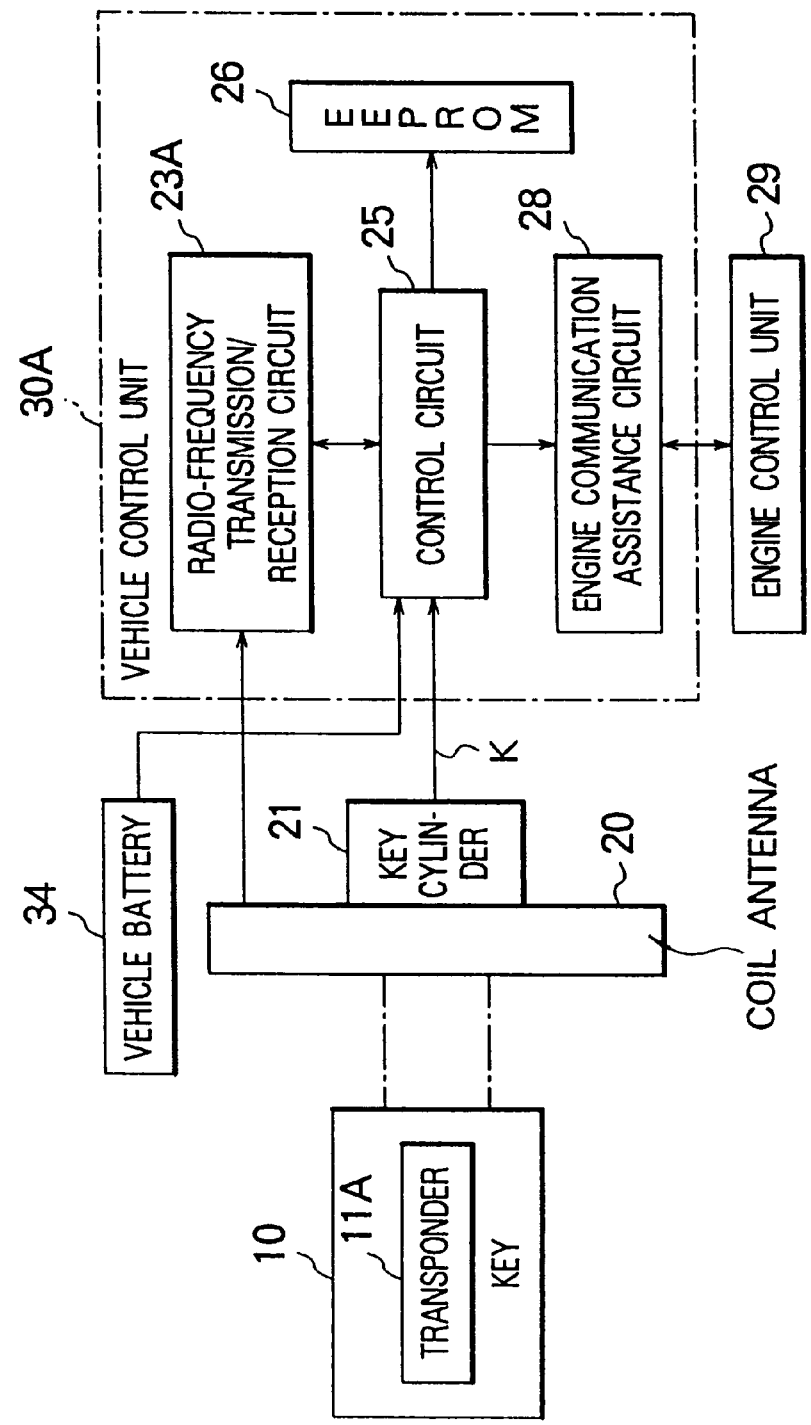
FIG. 12 is a block diagram showing the configuration of a known immobilizer system.
Figure 13:
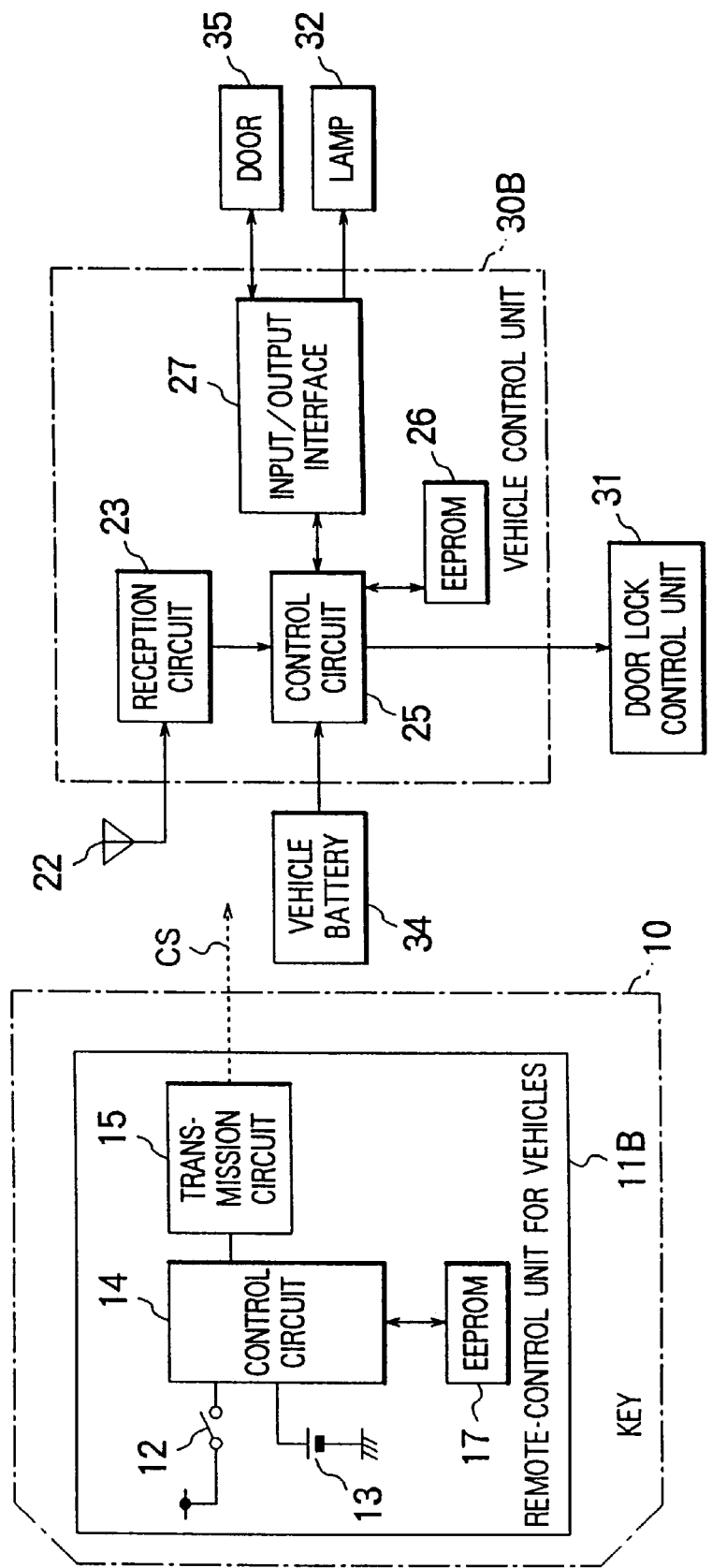
FIG. 13 is a block diagram showing the configuration of a known keyless entry system.

In FIG. 1, components identical to those shown in FIGS. 12 and 13 are assigned the same reference numerals. The description of the components will be omitted.

A vehicle security system in accordance with the first embodiment of the present invention comprises a remote-control unit 11 for vehicles united with a key 10, and a vehicle control unit 30 mounted in a vehicle.

A key cylinder 21 is connected on the input stage of the vehicle control unit 30 in the same manner as that mentioned previously (See FIG. 12). The key 10 having the remote-control unit 11 for vehicles incorporated therein is inserted to an insertion port of the key cylinder 21.

In this case, a control circuit 25 in the vehicle control unit 30 produces a cryptographic code CR necessary for an immobilizer system in response to a key detection signal K. Every time a cryptographic code is transmitted to the remote-control unit 11 for vehicles, the control circuit 25 modifies the cryptographic code CR using a random count value of high security.

A control circuit 14 in the remote-control unit 11 for vehicles produces a first cipher system code CS1 necessary for the immobilizer facility in response to the cryptographic code CR, and produces a second cipher system code CS2 necessary for a keyless entry facility on the basis of the cryptographic code CR. Every time the cipher system code CS2 is transmitted to the vehicle control unit 30, the control circuit 14 modifies the cipher system code CS2 by performing simple computation (by incrementing a numerical value of data).

The first and second cipher system codes CS1 and CS2 contain mutually-different random codes. The second cipher system code CS2 to be transmitted away from the vehicle during operation of the keyless entry facility is set to be represented by a larger radio-wave output within a necessary minimum range than the first cipher system code CS1 to be transmitted within the key cylinder 21 during execution of the immobilizer facility.

In EEPROMs 17 and 26 in the control circuits, a latest cryptographic code CR set for operation of the immobilizer facility is stored, and the first and second cipher system codes associated with the cryptographic code CR are also stored if necessary.

The vehicle control unit 30 having the control circuit 25 as a center includes a reception circuit 23 for receiving a first cipher system code CS1 necessary for the immobilizer facility and a second cipher system code CS2 necessary for the keyless entry facility (generically cipher system codes CS) in the form of of radio waves, a transmission circuit 24 for transmitting a cryptographic code CR necessary for the immobilizer facility, and an EEPROM 26 for storing a current cryptographic code CR and cipher system codes CS based on the cryptographic code CR.

The vehicle control unit 30 includes an engine communication assistance circuit 28 for assisting in achieving bidirectional transmission necessary for the immobilizer facility between the control circuit 25 and an engine control unit 29, and an input/output interface 27 for outputting a door lock control signal DL necessary for the keyless entry facility from the control circuit 25 to a door lock control unit 31.

A cryptographic code CR in the EEPROM 26 is retrieved for each operation of the immobilizer facility, and transmitted to the remote-control unit 11 for vehicles. After the transmission, as described later, the cryptographic code CR is updated through computation and restored.

The cryptographic code CR and cipher system codes CS each contain a triggering signal to be described later and an ID code to be set with every handling of the key.

The input/output interface 27 fetches a response signal (not shown) for checking handling which is sent from the door lock control unit 31. Likewise, the input/output interface 27 outputs a driving control signal to each of a lamp 32 for illuminating a vehicle room and a horn 33 that is a Klaxon, and fetches response signals sent from the lamp 32 and horn 33.

The engine communication assistance circuit 28 transmits a start permission signal ST sent from the control circuit 25 to the engine control unit 29, receives a response signal RE for checking handling from the engine control unit 29, and inputs the response signal RE to the control circuit 25.

A coil antenna 20 located at the insertion port of the key cylinder 21 transmits a cryptographic code CR necessary for the immobilizer facility to the remote-control unit 11 for vehicles, and receives cipher system codes CS from the remote-control unit 11 for vehicles. The key cylinder 21 mechanically detects the fact that the key 10 fitted into the key cylinder 21 lies at a given operational position, and inputs a key detection signal K to the control circuit 25.

By the way, the remote-control unit 11 for vehicles in the key 10 includes a manual switch 12, battery 13, control circuit 14, transmission circuit 15, and EEPROM 17 which have been described previously, as well as a reception circuit 16 for receiving a cryptographic code CR necessary for the immobilizer facility sent via the coil antenna 20.

As described previously (See FIG. 13), the manual switch 12 is handled externally in order to open or lock a door lock during operation of the keyless entry facility.

In the remote-control unit 11 for vehicles, the battery 13 is incorporated for supplying power to the control circuit 14 responsible for transmission of cipher system codes during operation of the keyless entry facility.

In this case, the transmission circuit 15 uses a radio wave to transmit cipher system codes CS based on a cryptographic code CR stored in the EEPROM 17 under the control of the control circuit 14, and thus transmits the cipher system codes CS to the reception circuit 23 in the vehicle control unit 30 via the coil antenna 20.

The reception circuit 16 receives a cryptographic code CR from the transmission circuit 24 in the vehicle control unit 30 via the coil antenna 20 in the form of a radio wave during operation of the immobilizer facility.

When receiving a cryptographic code CR (containing a triggering signal and cipher data) from the vehicle control unit 30, the control unit 14 in the remote-control unit 11 for vehicles judges from the triggering signal if the cryptographic code CR is correct. Only a cryptographic code CR judged to be correct is stored in the EEPROM 17 in order to update the contents of the EEPROM 17.

In the EEPROM 17, therefore, a latest cryptographic code CR sent from the vehicle control unit 30 during the previous operation of the immobilizer facility is stored all the time. Cipher system codes CS (containing an ID code and others) associated with a current cryptographic code CR are also updated and stored.

Cipher system codes CS stored in the EEPROM 17 are retrieved by the control circuit 14 according to transmission timing dependent on a cryptographic code CR produced during operation of the immobilizer facility, or transmission timing within operation of the keyless entry facility.

Figure 2:
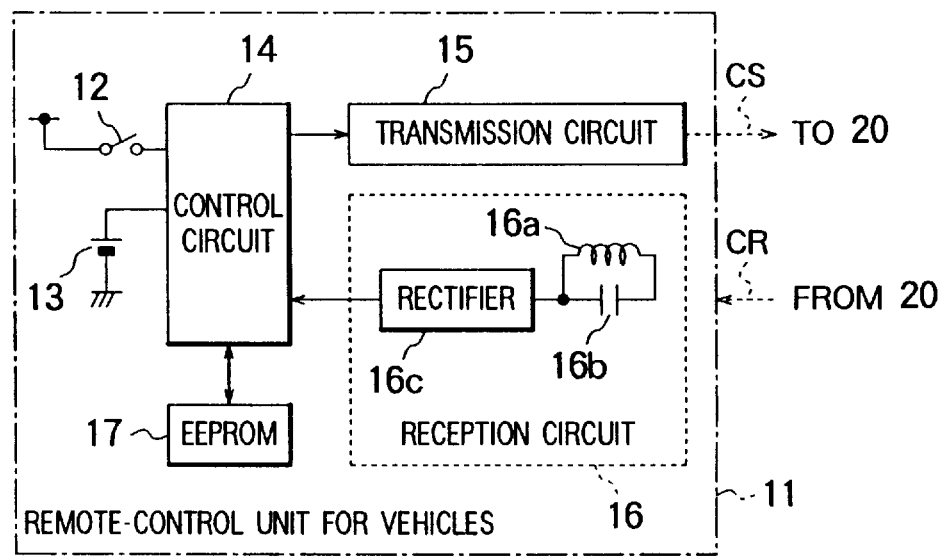
FIG. 2 is a block diagram showing an example of the configuration of a reception circuit in a remote-control unit for vehicles in accordance with the first embodiment of the present invention which employs an electromagnetic effect.

FIG. 2 is a block diagram showing the reception circuit 16 shown in FIG. 1 more particularly. In the drawing, the reception circuit 16 is formed with a circuit based on electromagnetic coupling.

In FIG. 2, the reception circuit 16 includes a coil 16a having inductance, a capacitor 16b having capacitance, and a rectifier 16c.

The coil 16a and capacitor 16b are connected in parallel with each other, constitute a resonant circuit, and receive a cryptographic code CR owing to electromagnetic coupling. The rectifier 16c is inserted between the resonant circuit and control circuit 14, rectifies the cryptographic code CR (AC signal) received by the resonant circuit 16a and 16b, and inputs a resultant code to the control circuit 14.

Figure 3:
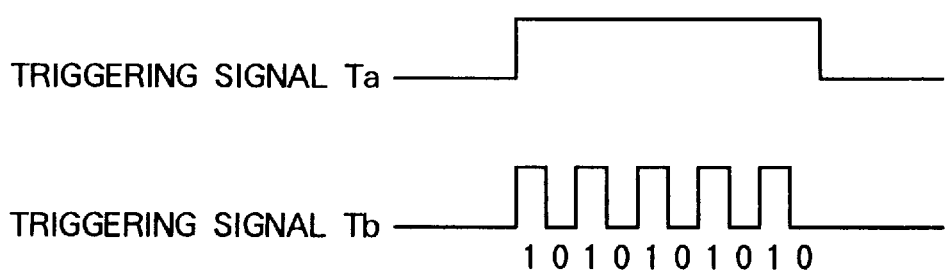
FIG. 3 is an explanatory diagram showing examples of wave patterns of a triggering signal contained in a cryptographic code employed by an immobilizer facility in accordance with the first embodiment of the present invention.

FIG. 3 is an explanatory diagram showing an example of wave patterns of a triggering signal contained in a cryptographic code CR necessary for the immobilizer facility sent from the vehicle control unit 30.

The triggering signal is different from vehicle to vehicle. For example, in FIG. 3, a triggering signal Ta is a simple rectangular wave, while a triggering signal Tb is composed of a plurality of pulse trains.

A triggering signal for specifying each vehicle is not limited to the examples of waves (Ta and Tb) shown in FIG. 3 but is formed with any combinational data composed of first several bits (9 bits in the example of FIG. 3) of a cryptographic code CR.

The waveform of a triggering signal is pre-set in the EEPROM 26 in the vehicle control unit 30, and stored in the EEPROM 17 in the remote-control unit 11 for vehicles at the time of initial transmission for operation of the immobilizer facility.

A triggering signal contained in a cryptographic code CR serves as a command signal for requesting the remote-control unit 11 for vehicles to transmit a first cipher system code CS1.

Random data (not shown) contained in a cryptographic code CR is composed of a plurality of bits (for example, about 20 bits) succeeding the triggering signal Ta or Tb, and contains various control commands and an ID code.

The control circuit 14 in the remote-control unit 11 for vehicles operates using the battery 13 as a power supply, and has the keyless entry facility for producing a second cipher system code CS2 from a cryptographic code CR existent in the EEPROM 17 in response to a contact signal sent from the manual switch 12, and allowing the transmission circuit 15 to send the second cipher system code CS2 in the form of a radio wave, and the immobilizer facility for allowing the reception circuit 16 to receive a cryptographic code CR from the vehicle control unit 30 and automatically transmitting a first cipher system code CS1 to the vehicle control unit 30.

The control circuit 25 in the vehicle control unit 30 operates using a vehicle battery 34 as a power supply, allows the transmission circuit 24 to transmit a cryptographic code CR in response to a key detection signal K generated when the key is fitted into the key cylinder 21, and allows the reception circuit 23 to receive a response signal (first cipher system code CS1) from the remote-control unit 11 for vehicles.

The control circuit 25 has the immobilizer facility that compares a received first cipher system code CS1 with data in the EEPROM 26, and that when judging that the first cipher system code CS1 is correct, transmits a start permission signal ST to the engine control unit 29.

The control circuit 25 has the keyless entry facility that when the second cipher system code CS2 is received, outputs a door lock control signal DL to the door lock control unit 31 via the input/output interface 27.

The control circuit 25 has a facility for driving the lamp 32 in a vehicle room or the horn 33 that is a Klaxon so as to inform a user of a door lock-operated state.

Next, referring to the flowcharts of FIGS. 4 and 5, the processing operation of the vehicle security system in accordance with the first embodiment of the present invention shown in FIGS. 1 to 3 will be described.

Figure 4:
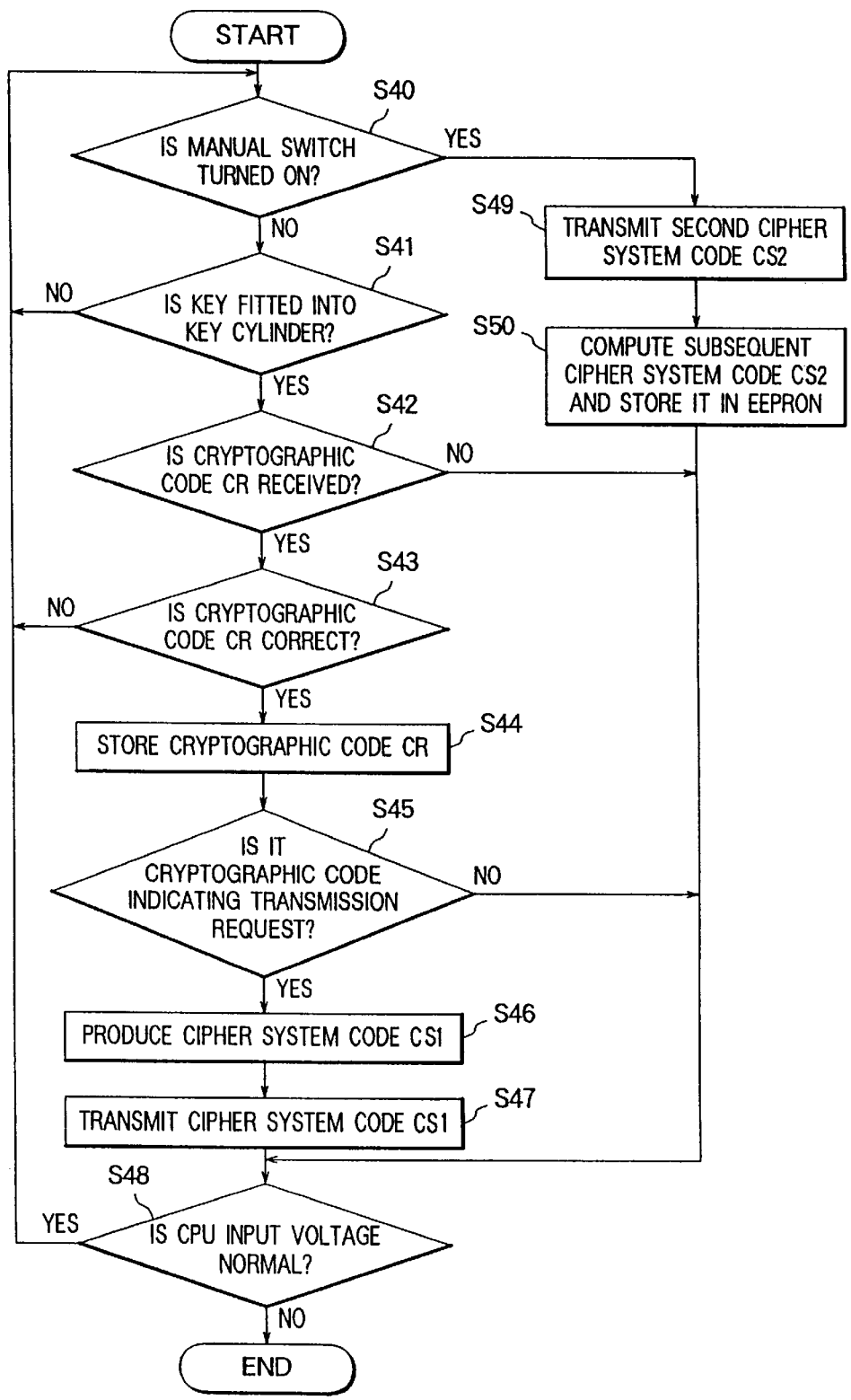
FIG. 4 is a flowchart describing a processing operation performed by the remote-control system for vehicles in accordance with the first embodiment of the present invention.

FIG. 4 describes the operation of the remote-control unit 11 for vehicles incorporated in the key 10. In FIG. 4, S41 to S48 are processing steps followed when the vehicle security system functions as an immobilizer system. S40, S49, and S50 are processing steps followed when the vehicle security system functions as a keyless entry system.

Figure 5:
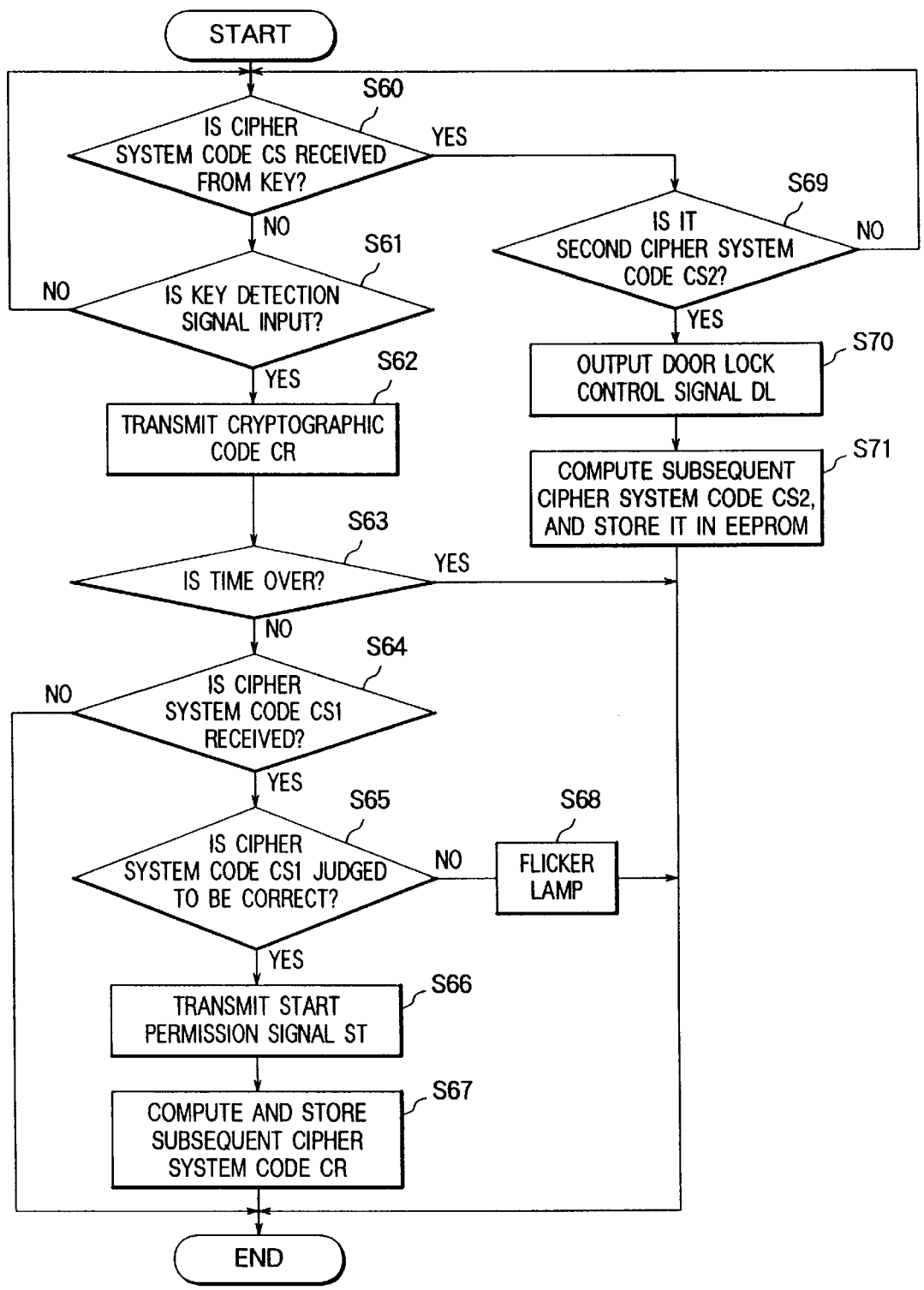
FIG. 5 is a flowchart describing a processing operation performed by a vehicle control unit in accordance with the first embodiment of the present invention.

Likewise, FIG. 5 describes operations of the vehicle control unit 30. In FIG. 5, S61 to S68 are processing steps followed when the vehicle security system functions as an immobilizer system. S60 and S69 to S71 are processing steps followed when the vehicle security system functions as a keyless entry system.

To begin with, the operation of the remote-control unit 11 for vehicles as a unit included in the immobilizer system will be described according to steps S41 to S48 shown in FIG. 4.

A cryptographic code CR that is the same as the one stored in the EEPROM 26 in the vehicle control unit 30 is stored in advance in the EEPROM 17 in the remote-control unit 11 for vehicles.

First, the control circuit 14 in the remote-control unit 11 for vehicles Judges whether or not the manual switch 12 has been turned ON (step S40). If it is judged that the manual switch 12 has not been turned ON (No in FIG. 4), it is judged whether or not the key 10 has been fitted into the key cylinder 21 of the vehicle (step S41).

If the key 10 has not been fitted into the key cylinder 21 (No in FIG. 4), control is returned to step S40. A standby state remains until the key 10 is fitted into the key cylinder 21.

When the engine is started, if a user fits the key 10 into the key cylinder 21 and turns it without handling the manual switch 12, it is judged at step S41 that the key 10 has been fitted into the key cylinder 21 (Yes in FIG. 4).

With fitting of the key 10, the key cylinder 21 produces a key detection signal K and inputs it to the vehicle control unit 30.

This causes the control circuit 25 in the vehicle control unit 30 to produce a cryptographic code CR (to be described later) containing random data that is modified for each operation of the immobilizer facility. At this time, a triggering signal is not modified.

Next, the control circuit 14 in the remote-control unit 11 for vehicles judges whether or not a cryptographic code CR has been received via the coil antenna 20 placed in the key cylinder 21 (step S42). If it is judged that the cryptographic code CR has been received (Yes in FIG. 4), the received cryptographic code CR is compared with a cryptographic code stored in the EEPROM 17. Depending on whether or not both the triggering signals are consistent, it is judged whether or not the cryptographic code CR is correct (step S43).

If it is judged that the cryptographic code CR is incorrect (No in FIG. 4), control is returned to step S40. If it is judged that the cryptographic code CR is correct (Yes in FIG. 4), the cryptographic code received this time is stored in the EEPROM 17 in order to thus update the contents of the EEPROM 17 (step S44).

At this time, the cryptographic code CR contains a triggering signal that is different from vehicle to vehicle as described previously. For example, assuming that a triggering signal set for an own vehicle is a pulsed triggering signal Tb (See FIG. 3), even if a triggering signal Ta that is a simple rectangular wave is received, the triggering signals are judged to be inconsistent.

If triggering signals are inconsistent, an engine start inhibited state (to be described later) of the vehicle is not released. Theft can be prevented. If a vehicle adopting the same vehicle security system as the own vehicle lies adjacently, codes employed in the vehicles can be distinguished mutually. The own vehicle can therefore be specified reliably, thus preventing a malfunction.

Next, it is judged from the triggering signal contained in the cryptographic code CR whether or not the cryptographic code CR has requested transmission of a first cipher system code CS1 (step S45). If it is judged that the cryptographic code CR indicates a transmission request for the cipher system code CS1 (Yes in FIG. 4), a first cipher system code CS1 is produced on the basis of the cryptographic code CR stored in the EEPROM 17 (step S46).

As mentioned above, triggering signals stored as common data in the remote-control unit 11 for vehicles and the vehicle control unit 30 are collated (step S43). When a received triggering signal is judged to be correct, a cryptographic code CR newly stored in the EEPROM 17 is used to produce a first cipher system code CS1 as an immobilizer response code (step S46).

The thus produced cipher system code CS1 is transmitted by the transmission circuit 15, and input to the vehicle control unit 30 via the coil antenna 20 in the key cylinder 21 (step S47).

Finally, it is judged whether or not the voltage of the battery 13 to be applied to the control circuit 14 (CPU input voltage) is equal to or higher than a specified voltage (step S48). If it is judged that the voltage of the battery 13 is normal (Yes in FIG. 4), control is returned to the first step S40 of checking if the manual switch 12 is handled.

If the battery 13 has run out and it is judged that the battery voltage has fallen below the specified voltage (No in FIG. 4), an immobilizer routine described in FIG. 4 is terminated.

In this case, an improper operation of the remote-control unit 11 for vehicles or abnormal data occurs. For avoiding it, the battery 13 is replaced with a new one.

If it is judged at step S42 that no cryptographic code CR is received from the vehicle control unit 30 (No in FIG. 4), steps S43 to S47 are skipped. No cipher system code CS1 is transmitted but control is passed to step S48.

If it is judged at step S45 that the cryptographic code CR does not indicate a transmission request (No in FIG. 4), steps S46 and S47 are skipped. No cipher system code CS1 is transmitted but control is passed to step S48.

The foregoing processing operation of the immobilizer facility is automatically executed for several hundred milliseconds until the engine is started after a user fits the key 10 into the key cylinder 21 and turns it. The immobilizer facility is independent of the keyless entry facility that will be described later. Any special handling by a user is not needed.

In consideration of a reception time required for a cryptographic code to be received by the remote-control unit 11 for vehicles and a computation time required for a cipher system code CS1, the vehicle control unit 30 may transmit a cryptographic code CR necessary for computation of a cipher system code CS1 when the engine is started next time, thought it is not illustrated.

In this case, if a cryptographic code CR received by the reception circuit 16 indicates a computation request for a subsequent cipher system code, the control circuit 14 computes the subsequent cipher system code CS1 in advance in response to the request and stores it in the EEPROM 17.

This makes it possible to shorten a communication time and data collation time required by the immobilizer facility.

Next, the processing operation of the immobilizer facility of the vehicle control unit 30 mounted in a vehicle will be described according to steps S61 to S68 in FIG. 5.

Incidentally, the engine in the vehicle shall be controlled and set to a start inhibited state prior to engine start.

First, the control circuit 25 in the vehicle control unit 30 judges whether or not a cipher system code CS (first or second cipher system code) has been received from the remote-control unit 11 for vehicles (step S60). If it is judged that no cipher system code CS has been received (No in FIG. 5), it is judged whether or not a key detection signal K produced by the key cylinder 21 has been input (step S61).

If it is judged that the key detection signal K has not been input (No in FIG. 5), control is returned to step S60. A standby state is retained until a cipher system code CS is received and the key 10 is fitted.

By contrast, if it is judged that the key detection signal K has been input (Yes in FIG. 5), a cryptographic code CR indicating a transmission request for a first cipher system code CS1 is transmitted to the remote-control unit 11 for vehicles via the transmission circuit 23 and coil antenna 20 (step S62).

In other words, when the engine is started, if the key 10 is fitted into the key cylinder 21 and turned, the control circuit 25 judges from the key detection signal K that the key 10 has been fitted, converts a cryptographic code CR stored in advance in the EEPROM 26 into a radio wave, and transmits the radio wave.

It is then judged whether or not a certain time required for ensuring security has elapsed (the time is over) since execution of step S62 (step S63). If it is judged that the time is not over (No in FIG. 5), it is judged whether or not a first cipher system code CS1 has been received as a response from the remote-control unit 11 for vehicles within the certain time (step S64).

If it is judged at step S63 that the time is over (Yes in FIG. 5), or if it is judged at step S64 that the cipher system code CS1 has not been received (No in FIG. 5), it is regarded that a state in which the cipher system code CS1 will not be received within the certain time is set. The immobilizer routine described in FIG. 5 is then quit in that state. In this case, the engine start inhibited state is retained.

By contrast, if it is judged at step S64 that the first cipher system code CS1 has been received (Yes in FIG. 5), the received cipher system code CS1 is compared with a cipher system code computed in advance and stored in the EEPROM 26. Depending on whether or not the codes agree with each other, it is judged whether or not the cipher system code CS1 is correct (step S65).

If both the codes agree with each other and the cipher system code CS1 is judged to be correct (Yes in FIG. 5), the control circuit 25 outputs a start permission signal ST to the engine control unit 29 via the engine communication assistance circuit 28, and thus communicates a command code indicating engine start permission (release of start inhibition) (step S66).

This enables normal engine start. Thereafter, when the key 10 is turned within the key cylinder 21, the engine is started actually.

Finally, a numerical value generated at random every time is stored as a subsequent cryptographic code CR in the EEPROM 26 in order to improve security (step S67). The routine described in FIG. 5 is quit, and thus the immobilizer operation is terminated.

By contrast, if it is judged at step S65 that the received cipher system code CS1 disagrees with the cipher system code in the EEPROM 26 and the cryptographic code is incorrect (No in FIG. 5), the room lamp 32 is flickered as an alarm to a user (step S68). The routine described in FIG. 5 is quit, and thus the immobilizer operation is suspended.

In FIG. 5, when step S67 of computing and storing a subsequent cryptographic code CR is executed, the immobilizer processing is completed. Alternatively, the subsequent cryptographic code CR may be transmitted to the remote-control unit 11 for vehicles succeedingly to step S67.

In this case, as mentioned above, since the remote-control unit 11 for vehicles can execute in advance data transmission/reception and encryption, when the immobilizer facility is operated next, a data transmission time required for transmitting data to the remote-control unit 11 for vehicles or computation times required by the remote-control unit 11 for vehicles and vehicle control unit 30 can be shortened.

A cipher system code CS1 associated with a cryptographic code CR is produced by the remote-control unit 11 for vehicles or vehicle control unit 30 according to the same encryption procedure.

An exemplary encryption procedure may be conformable to the "Data Encryption Standard (DES)" described in, for example, Section 3 in "Modern Encryption Theory" (compiled by the Institute of Electronics Information and Communication Engineers).

According to the above literature, generally, when an encryption procedure is unknown, it is almost impossible to restore original data from a cipher system code. This means that the security of data such as a password number or individual ID number is superb.

Next, a keyless entry processing operation carried out by the remote-control unit 11 for vehicles will be described according to steps S40, S49, and S50 in FIG. 4.

For keyless entry handling such as unfastening the door lock, a user does not fit the key 10 into the key cylinder 21 but holds the key 10 away from the vehicle and turns ON the manual switch 12.

At this time, the control circuit 14 in the remote-control unit 11 for vehicles judges at step S40 that the manual switch 12 has been turned ON (Yes in FIG. 4), reads a second cipher system code CS2 necessary for the keyless entry facility from the EEPROM 17, and allows the transmission circuit 15 to transmit it (step S49).

The second cipher system code CS2 is produced by performing different computation from the first cipher system code CS1 necessary for the immobilizer facility on the basis of a current cryptographic code CR stored in the EEPROM 17.

The second cipher system code CS2 transmitted from the remote-control unit 11 for vehicles is received by the reception circuit 23 via the coil antenna 20, and input to the control circuit 25 in the vehicle control unit 30.

After completing transmission of the second cipher system code CS2 (step S49), the control circuit 14 uses a cryptographic code CR stored in the EEPROM 17 to obtain a subsequent cipher system code CS2 necessary for the keyless entry facility, and stores it in the EEPROM 17 (step S50).

At this time, the subsequent second cipher system code CS2 can be obtained through simple computation, for example, by incrementing the data value of the current cipher system code CS2 by one. Every time the keyless entry operation is repeated, the numerical value is incremented, thus updated, and then stored.

By contrast, a cryptographic code CR remains unchanged unless it is updated with operation of the immobilizer facility.

The cipher system code CS2 necessary for the keyless entry facility is produced through simple computation using as a reference a cryptographic code CR sent from the vehicle control unit 30 every time the immobilizer facility is operated at the time of engine start, and thus modified greatly every time the immobilizer facility is operated.

Thus, the keyless entry facility can improve the security of data, and helps avoid a vehicle-related trouble (illegal opening or closing of the door lock) by an interceptor of the cipher system code CS2.

Incidentally, the keyless entry facility for opening or closing the door lock is based on unidirectional transmission from the key 10 to the vehicle and is less important than the immobilizer facility based on bidirectional transmission.

Complex random computation therefore need not be used to obtain a subsequent cipher system code CS2.

After storing the subsequent second cipher system code CS2 necessary for the keyless entry facility (step S50) is completed, control is passed to step S48 of power supply check.

Next, a keyless entry processing operation carried out by the vehicle control unit 30 will be described according to steps S60, and S69 to S71 in FIG. 5.

First, when a user turns ON the manual switch 12, the remote-control unit 11 for vehicles transmits a second cipher system code CS2. The control circuit 25 in the vehicle control unit 30 judges at step S60 that a cipher system code CS distinguishable from a noise has been received (Yes in FIG. 5).

The control circuit 25 then compares the received cipher system code CS with a second cipher system code CS2 stored in the EEPROM 26. If the triggering signals in both the codes are consistent, the cipher system code CS is judged to be correct. Moreover, it is judged from random data contained in the cipher system code CS whether or not the received cipher system code CS indicates a specific code relevant to the door lock (second cipher system code) (step S69).

If it is judged that the received cipher system code CS is incorrect or is not a second cipher system code CS2 (No in FIG. 5), control is returned to step S60. A standby state is retained until another cipher system code CS is received.

If it is judged at step S69 that the received cipher system code CS2 is correct and indicates the specific code relevant to the door lock (Yes in FIG. 5), a door lock control signal DL for commanding the door lock control unit 31 to close the door lock (to lock the door) or open the door lock (to unlock the door) (step S70).

After the door lock is controlled through the keyless entry operation, the control circuit 25 calculates a subsequent cipher system code CS2 through the same computation method as the aforesaid computation method adopted by the control circuit 14 in the remote-control unit 11 for vehicles, that is, by incrementing the the data value of a current cipher system code CS2, stores the subsequent cipher system code CS2 in the EEPROM 26 (step S71), and then quits the keyless entry routine described in FIG. 5.

Figure 6:
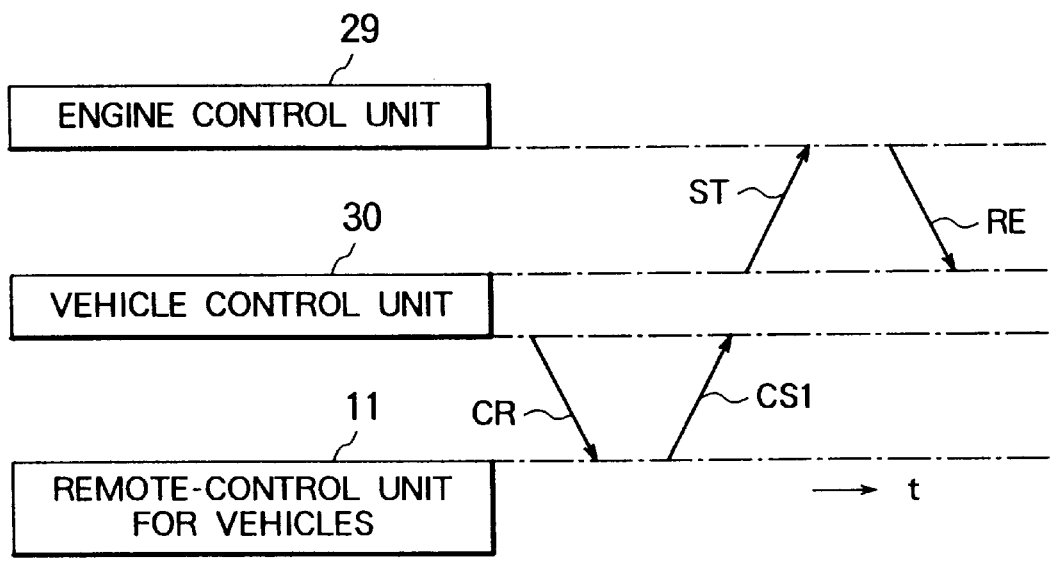
FIG. 6 is an explanatory diagram showing time-sequentially a state of data communication achieved by the immobilizer facility in accordance with the first embodiment of the present invention.

FIG. 6 is an explanatory diagram graphically showing signal communication timing within the immobilizer operation, illustrating a state in which a time-series signal is transmitted and received bidirectionally between each pair of the units 11, 29, and 30.

Figure 7:
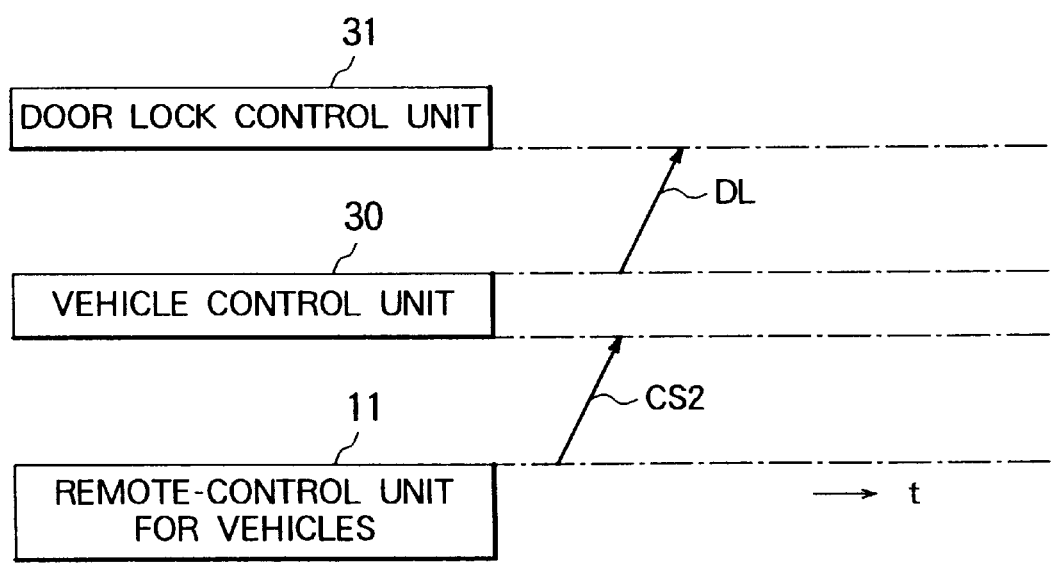
FIG. 7 is an explanatory diagram showing time-sequentially a state of data communication achieved by a keyless entry facility in accordance with the first embodiment of the present invention.

FIG. 7 is an explanatory diagram graphically showing signal communication timing within the keyless entry operation, illustrating a state in which a time-series signal is transmitted and received unidirectionally between each pair of the units 11, 30, and 31. In the drawings, the axis of abscissae indicates time t.

During operation of the immobilizer facility, as shown in FIG. 6, a cryptographic code CR is transmitted from the vehicle control unit 30 to the remote-control unit 11 for vehicles. In response to the cryptographic code CR, the remote-control unit 11 for vehicles transmits a first cipher system code CS1 to the vehicle control unit 30.

When the vehicle control unit 30 transmits a start permission signal ST to the engine control unit 29, the engine control unit 29 transmits a response signal RE to the vehicle control unit 30. This enables engine start. Thereafter, when the key 10 is handled, the engine is started.

The foregoing communication sequence is repeated every time the immobilizer facility is operated.

By contrast, during operation of the keyless entry facility, as shown in FIG. 7, a second cipher system code indicating a door lock handling request is transmitted from the remote-control unit 11 for vehicles to the vehicle control unit 30. In response to the request, the vehicle control unit 30 outputs a door lock control signal DL to the door lock control unit 31.

Thereafter, the door lock control unit 31 closes or opens the door lock.

As apparent from FIG. 7, since the keyless entry facility is operated through unidirectional transmission, the response time is shorter. Consequently, communication can be achieved for a short period of time.

Thus, since the reception circuit 16 is included in the remote-control unit 11 for vehicles, bidirectional transmission for operating the vehicle security system as an immobilizer system can be carried out. When the bidirectional transmission is used in combination with unidirectional transmission for operating the vehicle security system as a keyless entry system, both the systems can be installed effectively in unison in the single key 10.

Since centralized management is realized by uniting the immobilizer system and keyless entry system, maintenance of the remote-control unit 11 for vehicles is simplified and the number of parts is decreased. Consequently, cost can be reduced.

Moreover, a user need not own two systems separately. Since the manual switch 12 should be handled only when the keyless entry facility is operated, but need not be handled when the immobilizer facility is operated. Handling can be simplified.

During operation of the immobilizer facility, a first cipher system code CS1 different from a second cipher system code CS2 necessary for the keyless entry facility is produced automatically. The immobilizer system can operate independently. This obviates the necessity of carrying out keyless entry handling at the time of engine start.

Moreover, since the keyless entry facility and immobilizer facility are integrated into the vehicle control unit 30, a space a motorcar manufacturer must preserve for mounting the vehicle control unit 30 in a vehicle becomes smaller. The number of connection lines decreases, and a cost reduction is realized. As for maintenance after mounting is completed, since centralized management is possible, labor is lightened.

Communication data (cryptographic code CR and cipher system codes CS) to be transferred between the remote-control unit 11 for vehicles and the vehicle control unit 30 is encrypted. Different data can be transmitted for each communication. Interpretation enabled by learning an encryption technique or prediction of a subsequent code becomes hard to do. This leads to improved security.

In particular, during operation of the immobilizer facility, the remote-control unit 11 for vehicles and vehicle control unit 30 use cipher data through bidirectional transmission. Unpredictable data is therefore transmitted and received every time. This leads to further improved security.

In the remote-control unit 11 for vehicles, electromagnetic coupling with the resonant circuit 16a and 16b in the reception circuit 16 is used to receive a cryptographic code CR. The reception circuit 16 can therefore receive data without the need of a power supply.

A radio-wave output of a first cipher system code CS1 necessary for the immobilizer facility is smaller than a radio-wave output of a second cipher system code CS2 necessary for the keyless entry facility. Interception of the cipher system code CS1 due to leakage of a radio wave can therefore be prevented, and a power consumption of the battery 13 can be suppressed to a minimum necessary level.

Furthermore, if a triggering signal contained in a cryptographic code CR transmitted from the vehicle control unit 30 is constructed like the triggering signal Ta or Tb (See FIG. 3) by combining a plurality of data items, an own vehicle can be specified reliably.

Second Embodiment

In the aforesaid first embodiment, at step S69 of judging whether or not a second cipher system code CS2 needed during operation of the keyless entry facility is correct, the control circuit 25 judges whether or not a received cipher system code CS2 agrees with a cipher system code CS2 in the EEPROM 26. If a difference between both the codes falls within a certain range, the codes may be judged to agree with each other.

This is because a subsequent cipher system code CS2 transmitted from the remote-control unit 11 for vehicles is different for each transmission. If communication with the coil antenna 20 is not established or if the manual switch 12 is handled in a place outside a range in which communication with the coil antenna 20 is enabled, although an object of the keyless entry facility is an own vehicle, a cipher system code CS2 transmitted from the remote-control unit 11 for vehicles does not fully agree with a cipher system code CS2 stored in the vehicle control unit 30. A situation in which the keyless entry facility cannot be attained may arise.

In the second embodiment, therefore, even when the numerical data in a cipher system code CS2 transmitted from the remote-control unit 11 for vehicles does not fully agree with the numerical data in a cipher system code CS2 in the vehicle control unit 30, as long as a difference between the numerical data items falls within a certain range, the codes are judged to agree with each other.

Even if a communicating state is a bit imperfect, a possibility that the keyless entry facility is not executed can be minimized.

Third Embodiment

In the first embodiment, a radio wave is used to transmit a cryptographic code CR from the vehicle control unit 30 to the remote-control unit 11 for vehicles. Alternatively, a magnetic wave may be employed.

The third embodiment in which a magnetic wave is used to transmit a cryptographic code CR will be described in conjunction with a drawing.

Figure 8:
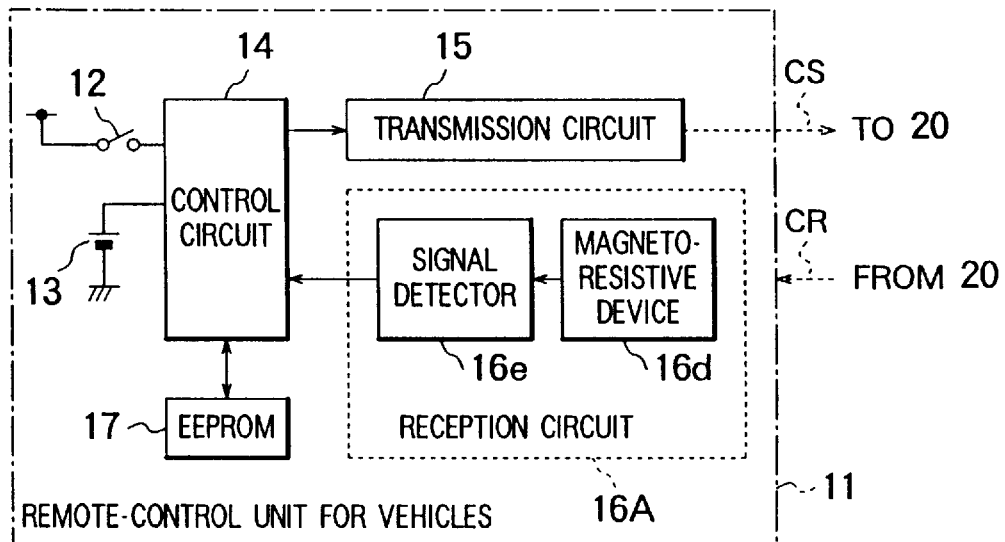
FIG. 8 is a block diagram showing an example of the configuration of a reception circuit (employing a magneto-resistive device) in a remote-control unit for vehicles in accordance with the third embodiment of the present invention.

FIG. 8 is a block diagram showing the configuration of the remote-control unit 11 for vehicles in the third embodiment. In FIG. 8, a reception circuit 16A comprises a magneto-resistive device 16d serving as a receiver and a signal detector 16e for detecting data.

The magneto-resistive device 16d receives a cryptographic code CR transmitted in the form of a magnetic wave via the coil antenna 20, and converts it into an electric wave.

The signal detector 16e then detects specific data from the electric wave output from the magneto-resistive device 16d and inputs it to the control unit 14.

As shown in FIG. 8, when a cryptographic code CR is transmitted using a magnetic wave, the coil antenna 20 can be used as an electromagnet in a transmitting means as it is.

If a permanent magnet (not shown) is substituted for the coil antenna 20, a power consumption of the vehicle control unit 30 can be saved. Eventually, a cost reduction can be realized.

Fourth Embodiment

In the third embodiment, a cryptographic code CR represented by a magnetic wave is received via the magneto-resistive device 16d. Alternatively, the cryptographic code CR may be received via a Hall element.

The fourth embodiment of the present invention in which a Hall sensor is included in the reception circuit in the remote-control unit 11 for vehicles will be described below.

Figure 9:
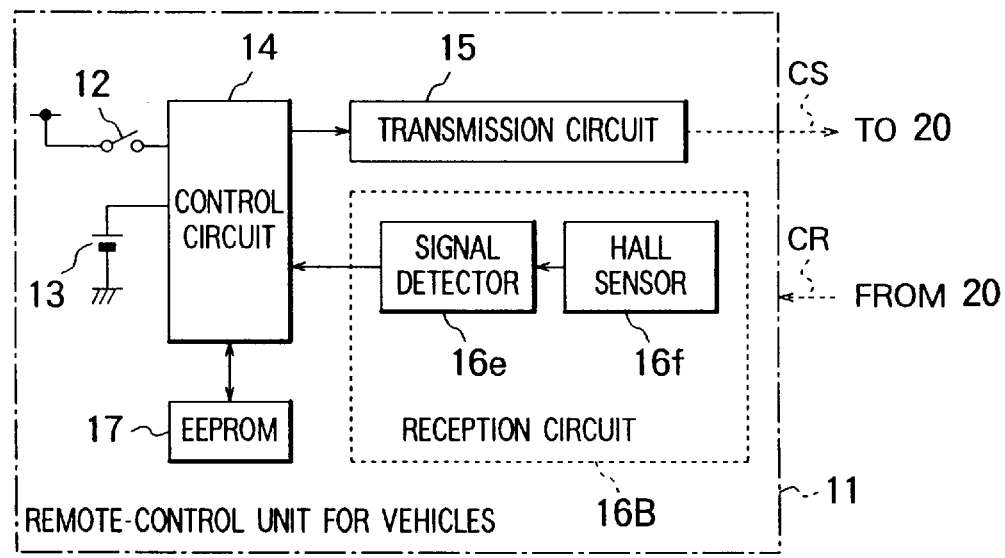
FIG. 9 is a block diagram showing an example of the configuration of a reception circuit (employing a Hall sensor) in a remote-control unit for vehicles in accordance with the fourth embodiment of the present invention.

FIG. 9 is a block diagram showing the configuration of the remote-control unit 11 for vehicles in the fourth embodiment. In FIG. 9, a reception circuit 16B includes a Hall sensor 16f serving as a receiver and the signal detector 16e for detecting data.

The Hall sensor 16f receives a cryptographic code CR transmitted in the form of a magnetic wave via the coil antenna 20, and converts it into an electric wave. The signal detector 16e inputs specific data contained in the electric wave to the control circuit 14.

Even in this case, a permanent magnet can be substituted for the coil antenna 20. Consequently, a power consumption of the vehicle control unit 30 can be saved and a cost reduction can be realized.

Fifth Embodiment

In the third and fourth embodiments, a cryptographic code CR is transmitted in the form of a magnetic wave. Alternatively, the cryptographic code CR may be transmitted in the form of light.

The fifth embodiment of the present invention in which a cryptographic code CR is transmitted in the form of light will be described in conjunction with a drawing.

Figure 10:
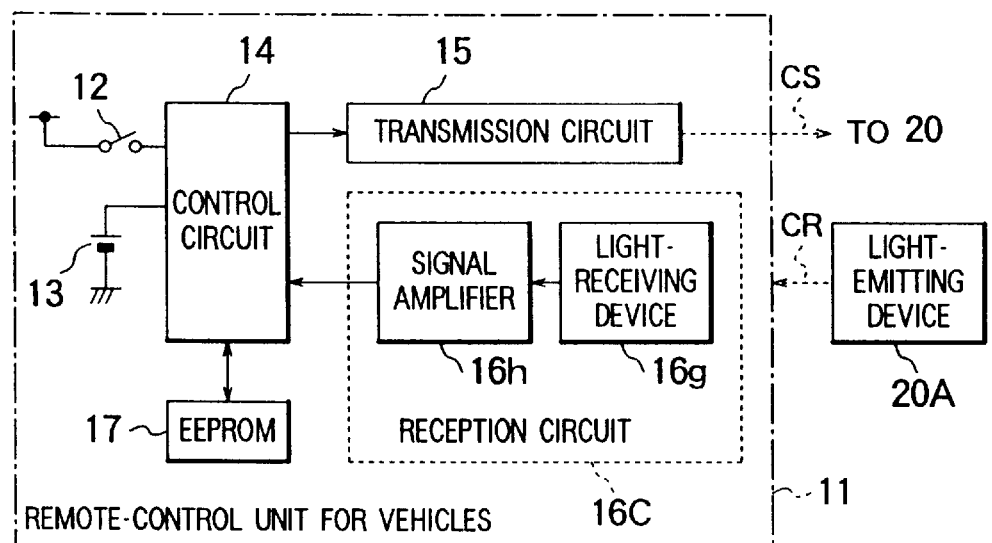
FIG. 10 is a block diagram showing an example of the configuration of a reception circuit (employing a light-receiving device) in a remote-control unit for vehicles in accordance with the fifth embodiment of the present invention.

FIG. 10 is a block diagram showing the configuration of the remote-control unit 11 for vehicles in the fifth embodiment. In FIG. 10, a reception circuit 16C includes a light-receiving device 16g serving as a receiver and a signal amplifier 16h.

The light-receiving device 16g receives a cryptographic code CR transmitted in the form of light such as infrared from the vehicle control unit 30, converts the cryptographic code CR into an electric wave containing data, and outputs the electric wave.

The signal amplifier 16h then extracts a cipher code from the electric wave output from the light-receiving device 16g, and inputs it to the control circuit 14.

By the way, the transmission circuit 24 in the vehicle control unit 30 (See FIG. 1) includes a light-emitting unit (not shown) for outputting light such as infrared. The key cylinder 21 has a light-emitting device 20A to be driven by the light-emitting unit.

When the key 10 is fitted into the key cylinder 21, the light-emitting device 20A transmits a cryptographic code CR in the form of light (for example, infrared) to the remote-control unit 11 for vehicles under the control of the control circuit 25.

In this case, the light-emitting device 20A is used as a transmitting means for transmitting a cryptographic code CR instead of the coil antenna 20. A power consumption needed by the vehicle control unit 30 for transmitting a cryptographic code CR can be saved.

Sixth Embodiment

In the first embodiment, a cryptographic code CR represented by a radio wave is received via the resonant circuit 16a and 16b. Alternatively, the cryptographic code CR may be received via a radio-frequency reception circuit.

The sixth embodiment of the present invention in which a radio-frequency reception circuit is substituted for the reception circuit in the remote-control unit 11 for vehicles will be described in conjunction with a drawing.

Figure 11:
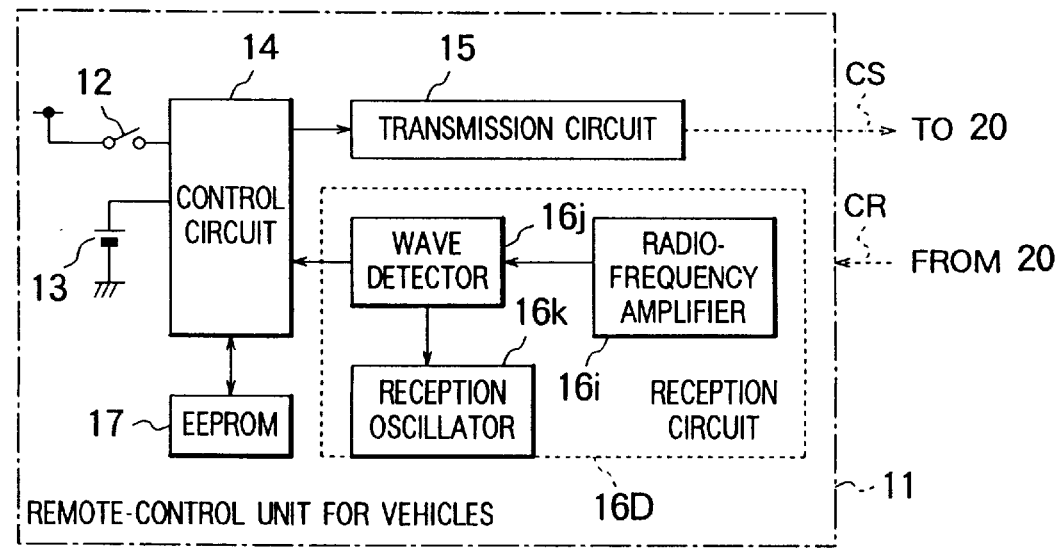
FIG. 11 is a block diagram showing an example of the configuration of a reception circuit (employing a radio-frequency reception circuit) in a remote-control unit for vehicles in accordance with the sixth embodiment of the present invention.

FIG. 11 is a block diagram showing the configuration of the remote-control unit 11 for vehicles in the sixth embodiment. In FIG. 11, a reception circuit 16D includes a radio-frequency amplifier 16i serving as a receiver, a wave detector 16j for detecting data, and a reception oscillator 16k for outputting a frequency component necessary for wave detection.

The radio-frequency amplifier 16i receives a cryptographic code CR represented by a radio wave, amplifies it, and inputs it to the wave detector 16j.

The wave detector 16j detects specific data from a received signal amplified at a frequency of an output of the reception oscillator 16k, and inputs it to the control circuit 14.

In FIG. 11, the transmission circuit 15 is configured separately from the reception circuit 16D. However, since the transmission circuit 15 is formed with a radio-frequency transmission circuit having substantially the same configuration as the reception circuit 16D, the same circuit may be used in common as the transmission circuit 15 and reception circuit 16D.

In other words, the same circuitry as that of the reception circuit 16D is adopted, and a transmitted signal (not shown) routed from the control circuit 14 to the radio-frequency amplifier is transmitted instead of a received signal routed from the radio-frequency amplifier 16i to the control circuit 14.

When a single radio-frequency transmission circuit is thus used to configure a transmission/reception circuit, the number of parts can be decreased and a cost reduction can be realized.

However, in this case, frequencies at which an output of the reception oscillator 16k is transmitted and received must be switched for each transmission or reception so that the frequencies can match the frequencies at which a cryptographic code CR and cipher system code CS are transmitted and received.

Seventh Embodiment

In the first embodiment, the vehicle control unit 30 executes the keyless entry facility alone (controls opening or closing of the door lock) in response to a second cipher system code CS2 generated with handling of the manual switch 12. Alternatively, the immobilizer facility (engine start permission) may be executed automatically succeedingly to unfastening of the door lock.

To be more specific, when a second cipher system code CS2 is received, if the door of an own vehicle is locked, the vehicle control unit 30 recognizes the second cipher system code CS2 as a door lock unfastening command, unfastens the door lock by sending a door lock control signal DL, and produces an engine start permission signal ST.

Before a user rides the vehicle and fits the key 10 into the key cylinder 21, a state in which engine start is enabled is already set. A response to an engine start request can be made quickly.

When a second cipher system code CS2 is received, if the door lock of an own vehicle is unfastened, the second cipher system code CS2 is regarded as a door lock command. A door lock control signal DL is then sent to merely lock the door. An engine start permission signal ST is not produced.

What is claimed is:

1. A remote-control unit for vehicles, incorporated in a key to be fitted into a key cylinder for starting an engine of a vehicle, for communicating with said vehicle, comprising:

a reception circuit for receiving a cryptographic code transmitted from said vehicle when said key is fitted into said key cylinder;

a memory circuit for storing said cryptographic code;

a manual switch to be handled by a user;

a control circuit for producing a first cipher system code responsively to reception of said cryptographic code, and producing a second cipher system code responsively to handling of said manual switch, wherein said control circuit produces said second cipher system code, which is different for each communication, on the basis of said cryptographic code stored in said memory circuit; and a transmission circuit for transmitting said first and second cipher system codes in the form of radio waves to said vehicle, wherein said first cipher system code contains a command for permitting engine start for said vehicle; and said second cipher system code is produced on the basis of a cryptographic code existent in said memory circuit and contains a command for closing or opening the door lock of said vehicle.

2. A remote-control unit for vehicles according to claim 1, wherein said cryptographic code contains a triggering signal set to specify said vehicle; said control circuit judges from said triggering signal whether or not said cryptographic code is correct, and produces said first cipher system code in response to said triggering signal; and said memory circuit stores only said cryptographic code judged to be correct.

3. A remote-control unit for vehicles according to claim 1, wherein said first and second cipher system codes are mutually different.

4. A remote-control unit for vehicles according to claim 1, wherein a radio-wave output of said first cipher system code is set to be smaller than a radio-wave output of said second cipher system code.

5. A remote-control unit for vehicles according to claim 1, wherein said cryptographic code is represented by a radio wave; and said reception circuit includes a resonant circuit composed of a coil having inductance and a capacitor having capacitance, and receives said cryptographic code owing to electromagnetic coupling with said resonant circuit.

6. A remote-control unit for vehicles according to claim 1, wherein said cryptographic code is represented by a magnetic wave; and said reception circuit includes a magneto-resistive device and receives said cryptographic code via said magneto-resistive device.

7. A remote-control unit for vehicles according to claim 1, wherein said cryptographic code is represented by a magnetic wave; and said reception circuit includes a Hall sensor and receives said cryptographic code via said Hall sensor.

8. A remote-control unit for vehicles according to claim 1, wherein said cryptographic code is represented by light; and said reception circuit includes a light-receiving device and receives said cryptographic code via said light-receiving device.

9. A remote-control unit for vehicles according to claim 1, wherein said cryptographic code is represented by a radio wave; and said reception circuit is formed with a radio-frequency reception circuit.

10. A vehicle security system employing a remote-control unit for vehicles set forth in claim 1, comprising:

a key in which said remote-control unit for vehicles is incorporated;

a key cylinder, located in a vehicle, for producing a key detection signal when said key is fitted thereinto; and a vehicle control unit, mounted in said vehicle, for communicating with said remote-control unit for vehicles, said vehicle control unit comprising:

a receiving means for receiving said first and second cipher system codes transmitted from said remote-control unit for vehicles;

a control means for producing said cryptographic code in response to said key detection signal, and controlling the engine and door of said vehicle responsively to reception of said first and second cipher system codes; and a transmitting means for transmitting said cryptographic code to said remote-control unit for vehicles, wherein said control means permits engine start for said vehicle in response to said first cipher system code, and controls the door lock of said vehicle in response to said second cipher system code.

11. A vehicle security system according to claim 10, wherein said control means produces a different cryptographic code for each communication.

12. A vehicle security system according to claim 11, wherein said control means uses a random count value to produce said cryptographic code for each communication.

13. A vehicle security system according to claim 10, wherein said cryptographic code contains a triggering signal for commanding said remote-control unit for vehicles to issue a transmission request for said first cipher system code.

14. A vehicle security system according to claim 13, wherein said triggering signal is formed with a combination of a plurality of data items set for specifying said vehicle.

15. A vehicle security system according to claim 10, wherein said control means in said vehicle control unit controls the door lock of said vehicle in response to said second cipher system code, and permits engine start for said vehicle.

16. A vehicle security system according to claim 10, wherein said control circuit in said remote-control unit for vehicles modifies said second cipher system code for each transmission; said control means in said vehicle control unit modifies said second cipher system code for each reception; said vehicle control unit includes a memory means for storing said second cipher system code that is modified for each reception; when a difference between said received second cipher system code and said second cipher system code stored in said memory circuit falls within a certain range, said control means judges that said received second cipher system code is correct; and said control means controls the door lock of said vehicle in response only to said second cipher system code judged to be correct.

17. A vehicle security system according to claim 10, further comprising an annular coil antenna located in said key cylinder so that said coil antenna can cooperate with said transmitting means in said vehicle control unit, wherein said reception circuit in said remote-control unit for vehicles includes a resonant circuit composed of a coil having inductance and a capacitor having capacitance, and said cryptographic code is represented by a radio wave and transmitted to said reception circuit through said coil antenna owing to electromagnetic coupling with said resonant circuit.

18. A vehicle security system according to claim 10, further comprising a magnet means located in said key cylinder so that said magnet means can cooperate with said transmitting means in said vehicle control unit, wherein said cryptographic code is represented by a magnetic wave and transmitted to said reception circuit in said remote-control unit for vehicles via said magnet means owing to a magnetic response effect.

19. A vehicle security system according to claim 10, further comprising a light-emitting device located in said key cylinder so that said light-emitting device can cooperate with said transmitting means in said vehicle control unit, wherein said reception circuit in said remote-control unit for vehicles includes a light-receiving device, and said cryptographic code is represented by light and transmitted to said reception circuit via said light-receiving device.

* * * * *